United States Patent [19]

Tsunekawa et al.

[11] 4,062,024
[45] Dec. 6, 1977

[54] CONTROL SYSTEM CONSISTING OF SEMI-CONDUCTOR INTEGRATED CIRCUITS FOR A CAMERA

[75] Inventors: Tokuichi Tsunekawa; Masanori Uchidoi, both of Yokohama; Masami Shimizu, Tokyo; Masayoshi Yamamichi, Kawasaki; Keiya Murayama, Fukushima; Hiroshi Aizawa, Machida, all of Japan

[73] Assignee: Canon Kabushiki Kaisha, Tokyo, Japan

[21] Appl. No.: 618,125

[22] Filed: Sept. 30, 1975

[30] Foreign Application Priority Data

Oct. 4, 1974  Japan .............................. 49-114835

[51] Int. Cl.² .............................................. G03B 7/00
[52] U.S. Cl. .................................. 354/60 R; 354/38; 354/288
[58] Field of Search ................. 354/23 D, 26, 29, 30, 354/36, 38, 40, 41, 42, 43, 44, 48, 50, 51, 60 R, 288, 219, 31

[56] References Cited

U.S. PATENT DOCUMENTS

| | | | |
|---|---|---|---|
| 3,670,639 | 6/1972 | Harnden, Jr. ..................... | 354/60 R |
| 3,812,499 | 5/1974 | Hayashi et al. .................. | 354/31 |
| 3,815,148 | 6/1974 | Ikeda et al. ...................... | 354/51 |
| 3,842,587 | 10/1974 | Strauss et al. .................... | 354/30 |
| 3,846,805 | 11/1974 | Kiyohara et al. ................. | 354/288 |
| 3,863,263 | 1/1975 | Itagaki ............................. | 354/60 R |
| 3,868,711 | 2/1975 | Sekida ............................. | 354/219 |
| 3,922,692 | 11/1975 | Yata et al. ........................ | 354/60 R |

OTHER PUBLICATIONS

"IC Electronics for Shutterbugs " by John R. Free, Radio – Electronics, Feb. 1969, pp. 39-42.

*Primary Examiner*—Russell E. Adams
*Attorney, Agent, or Firm*—Toren, McGeady and Stanger

[57] ABSTRACT

The present invention relates to a control system consisting of a semi-conductor integrated circuit for a camera, particularly a control system from providing secure operation as well as a reduction of complexity. The system provides for separation of actuating signals from the low level signals for the integrated circuit so as to prevent added noise of the actuating signals from mixing with the low level signal.

12 Claims, 11 Drawing Figures

A-A SECTIONAL VIEW

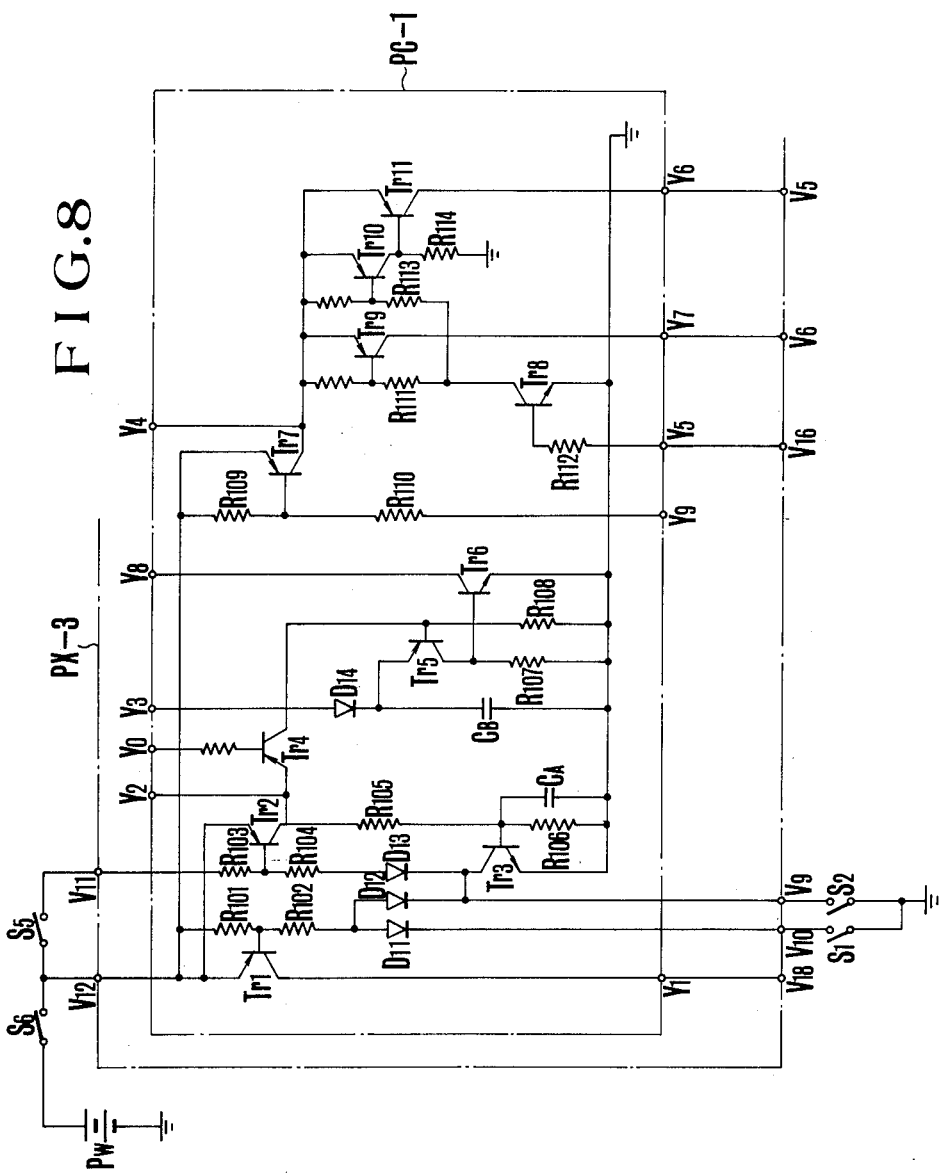

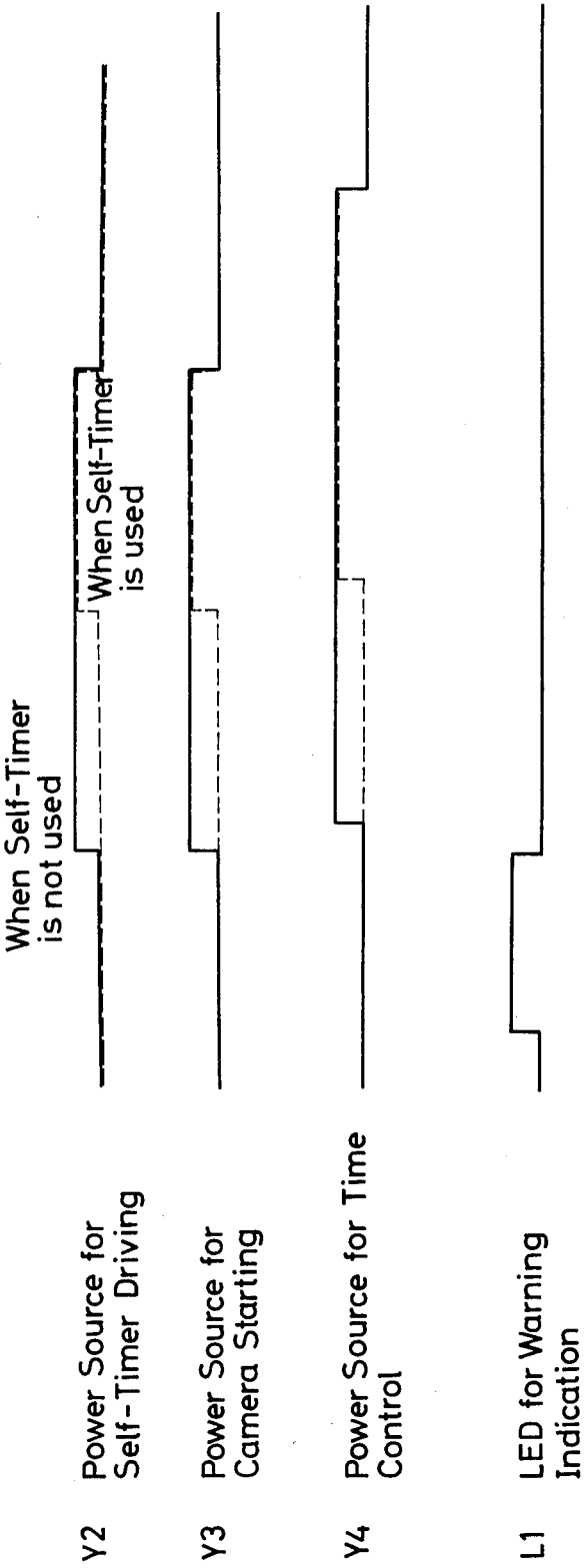

CONTROL SYSTEM CONSISTING OF SEMI-CONDUCTOR INTEGRATED CIRCUITS FOR A CAMERA

The present invention relates to a control system consisting of a semi-conductor integrated circuit for a camera, particularly a control system which provides a secure operation.

Until now, for use as control systems for controlling the operation of camera or of exposure, various systems including the use of the mechanical means, the use of electrical means or the combination of both means have been proposed. With regard to the system for controlling each operation by means of the mechanical means for example, in the case of the single reflex camera the brightness of the object to be photographed is at first measured by releasing the camera and then the processing operation is carried out with other informations to be set so as to set the shutter time or aperture mechanically. Afterwards the holding of the mirror raising up drive is released so as to raise the mirror, whereby the shutter is released. As explained above, each operation is carried out entirely mechanically, so that a comparatively secure operation can be expected. The system, however, becomes complicated, which is a shortcoming of the mechanical system. On the other hand, to the system for electrically controlling each operation, each starting signal for each operation is produced one after another so as to actuate each operation based upon this signal, whereby due to the level difference between the starting signal and other operation signals, a secure operation can often not be obtained. For example, in the above mentioned example, the level order of the signal as the result of the operation of the measured brightness of the object to be photographed and other informations to be set is extremely smaller than the level order of the starting signal for driving the mirror releasing member, the shutter release member and so on, whereby there exists a danger that the component of the latter signal will be mixed in the former signal as the noise. Such phenomenon often takes place even when each operation carried out is not purely electrically. For example, a battery of large capacity can not be used for a camera due to the spacial restriction. In consequence, it has been proposed that the current is allowed to flow only during the time necessary for the operation of the camera so as to economize the electrical power (U.S. Pat. No. 3,611,901). In the case of this kind of system, at the time of the switching on and the switching off, a current of high level is switched on and off. At the same time, noise takes place which noise is mixed in other signals of small component so as to cause the mis-operation of the camera.

As explained above, when there exists a plural number of signals with different level orders, it has been remarkably difficult to avoid the mixture among the signals in a conventional control system.

The purpose of the present invention is then to provide a control system of a camera, eliminating the above mentioned shortcoming.

Another purpose of the present invention is to offer a control system for a camera, eliminating the above mentioned shortcoming by electronically controlling the operating time of the control system.

Further purposes of the present invention will be disclosed from the explanation of the embodiments below to be made in accordance with the accompanying drawings.

FIG. 1-*a*, 1-*b* and 1-*c* respectively show the composition of the single reflex camera for which the present invention is applicable, more particularly;

FIG. 1-*a* shows the front view; FIG. 1-*b* shows the view seen from above; FIG. 1-*c* shows the section.

FIG. 2 shows a block diagram of the electrical control circuit to be built in the camera shown in FIG. 1.

FIGS. 3 and 4 respectively show a control circuit of the present invention which is the integrated circuit form of the one shown in FIG. 2.

FIGS. 5, 6 and 7 respectively show the electrical circuit diagram of the important part of the circuit shown in FIGS. 3 and 4.

FIG. 8 shows a concrete electrical circuit of the PC-1 circuit shown in FIG. 6.

FIG. 9 respectively shows the wave forms of the operation signals of the circuit shown in FIG. 8.

FIG. 1 shows the composition of the single reflex camera in which the automatic diaphragm control system with priority on shutter speed in accordance with the present invention is applied, whereby F is the camera frame composing the camera body and 213 and 223 respectively the base cover plate for covering the lower part of the camera frame F and the top cover plate. The parts provided in the camera frame F are almost the same as those of the ordinary single reflex camera so that their detailed explanations will be omitted.

$VR_6$ is the variable resistance unit including the resistance of the time constant circuit for the shutter time control. The value of the resistance can be varied by means of the shutter time setting dial 110. 200 is the switch block including the switch functionally engaged with the winding up operation as well as the shutter running. Further 201 is the clutch mechanism for transmitting the winding up power from the winding up lever to the winding up mechanism 202 as well as the shutter charge mechanism and so on. 203 and 204 are respectively the winding up spool as well as the sprocket. 205 is the shutter charge mechanism as well as the brake mechanism such as the master gear, pinion gear and so on in the focal plane shutter. Above these mechanisms, the disc unit is provided, whereby various switches are arranged in the dead space. $S_1$ and $S_2$ are the switches provided so as to be engaged with the shutter release button 7, whereby $S_1$ is closed when the shutter button 7 is pushed down to the first step, while $S_2$ is closed when the shutter button 7 is pushed down to the second step. Both switches $S_1$ and $S_2$ are opened when the shutter button 7 is returned to the initial position. $S_7$ is the switch so composed as to be closed in functional engagement of the self timer set button 7. $S_{11}$ is the switch so composed as to be closed in functional engagement of the setting of the shutter dial 110 at the position of "B" photography. In case of the "B" photography, the variable resistance $VR_6$ is set at a certain proper value. $S_5$ and $S_6$ are the switches so composed as to be closed when the winding up is finished, whereby $S_5$ is opened when the front shutter plane finishes running, while $S_6$ is opened when the rear shutter plane finishes running. $S_9$ is the X-contact switch so composed as to be closed when the front shutter plane finishes running. The pinion drum 206 for the front and the rear shutter plane is functionally engaged with the above mentioned pinion gear, the spring drum 207 for the front and the rear shutter plane is provided in opposition to the mirror box and, between the pinion drum 208 and the spring drum 207, the front and the rear shutter plane 209 is provided. $M_3$ is the magnet for controlling the rear shutter plane while in the parallel space between the mirror box 210 containing the mirror 101 and the pinion drum 208, the mirror raising up mechanism unit including the mirror raising up mechanism and so on is provided.

Further, in the parallel space between the mirror box 210 and the spring drum 207, the automatic exposure control unit 212 is provided. In the automatic exposure control unit the variable resistance $VR_3$ whose value is automatically set by means of the signal member provided at the rear end face of the interchangeable lens not shown in the drawing and presenting the axial length corresponding to the value of the maximum aperture value Avo of the lens, the variable resistance $VR_2$ for setting the compensation value Avc and the variable resistance $VR_5$ variable by the amount corresponding to a certain determined diaphragm step number by means of the diaphragm setting lever are provided.

Further, in the space surrounded by the bottom face of the mirror box 210, the bottom cover 213 and the screw 214 for mounting the tripod the automatic diaphragm unit 215 is provided. At the one end of the automatic diaphragm unit 215 at the side of the automatic exposure control unit 212, the automatic exposure control magnet $M_1$ is provided.

In the space surrounded by the bottom of the patrone chamber 216, the bottom of the spring drum 207 and the bottom cover 213, the magnet $M_2$ is provided on the camera release unit 217. Further, the memory switch $S_3$ to be opened in functional engagement with the armature of the above mentioned magnet is also provided. Further, between the bottom of the patrone chamber 216 and the bottom cover 213 the battery check switch 219 to be opened and closed by means of the battery check button 218 is provided.

Further, in the space surrounded by the pinion drum 208, the side walls of the camera frame 220 and the front plate 221, the battery 222 serving as the current source for the electronic shutter as well as the automatic exposure control mechanism and so on can be loaded. In the upper cover 223, the pentagonal prism 3, the meter $M_4$ for indication, the resistance $VR_1$ for process, the rewinding crank 225 and so on are provided, as shown in the drawing, beside the above mentioned resistance $VR_6$, the disc plate 224 and so on.

In the space between the pentagonal prism 3 and the meter $M_4$ for indication, the illuminating diode $L_2$ for indicating the completion of the charge of the flash light device mounted on the camera and the illuminating diode $L_1$ for alarming the over-or under-exposure are provided. Under the rewinding crank the variable resistance $VR_1$ in functional engagement with the ASA setting dial 226 is provided. On the front face of the camera body the illuminating diode $L_3$ for indicating the self timer mode which twinkles when the shutter button is pushed down in case of the self timer mode. Further, in the space between the pentagonal prism 3 and the upper cover 223 the integral circuit elements are provided.

Further, above the upper cover in which the pentagonal prism 3 is loaded, the accuracy shoe 4 is provided. Behind the pentagonal prism, the eye piece lens 103 is provided while at the side of the above face the light sensing element P of photosensitive diode such as SBC is provided.

FIG. 2 shows the block diagram of the camera composed as shown in FIG. 1. In the drawing, 101 is the quick return mirror, 102 and 103 are the Fresnel lens, focus plate and eye piece lens composing the conventional single reflex view finder optics, P the photosensitive diode light sensing elements such as SBC provided parallel to each other at the side of the upper face of the eye piece lens, $L_1$ and $L_2$ the illuminating diode for indicating the alarm provided in the neighborhood of the pentagonal prism whereby $L_1$ is for indicating the exposure limit while $L_2$ is for indicating the charge completion of the flash light device. 104 is the signal member provided at the rear end surface of the interchangeable lens and presenting the axial length corresponding to the maximum aperture value, whereby the signal member is a pin for compensating the error which takes place at the time of TTL totally opened light measurement in case the automatic diaphragm 105 provided in the interchangeable lens 2 assumes the maximum aperture value. $VR_2$ is the variable resistance whose value is automatically set by means of the signal member 104 and $AP_1 - AP_4$ the operation amplifiers composing the light measurement circuit block whereby $AP_1$ and $AP_2$ are the light measurement circuits whose inputs are connected with the light sensing element P, $AP_3$ and $AP_4$ the memory circuit and the operation circuit which are connected by means of the memory switch $S_3$ to be opened and closed by the magnet $M_2$ to be explained later, whereby the output of the block part is connected with the automatic exposure determining circuit block $B_2$ through the photographic mode changing over switch 109.

The contact a of the changing over switch 109 is for the day-light photographic mode while the contact b is for the flash light photographic mode. 61 in the light measuring circuit block $B_1$ is the K value button which is to be operated in case a special photography is carried out with improper exposure. The detailed explanation will be omitted. 110 is the shutter dial, whereby the variable resistance $VR_1$ is electrically connected with the circuit 109 in such a manner that the value of the variable resistance $VR_6$ is set by setting the shutter time with the shutter dial 110 so as to put the information of the shutter time into the operation circuit 108. In the concrete circuit to be explained as the circuit 109, the electronic changing over circuit operating purely electronically by means of the charging completion signal from the speed light device is used. Further, the automatic exposure determining circuit block $B_2$ presents the input to be connected with the output of the operation circuit $AP_4$ by means of the changing over switch. Because the meter driving circuit 111 is connected to the alarm circuit so as to connect the meter $M_4$ to the illuminating diodes $L_1$ and $L_2$, the aperture value at the time of taking a photograph is indicated in advance by means of the finger of the meter $M_4$ while when the proper exposure can not be obtained with the set shutter time the illuminating diode $L_1$ twinkles so as to give alarm. This mechanism has nothing to do directly with the present invention so that its detailed explanation will be omitted here. $M_1$ is the magnet to be connected to the output of the automatic exposure determining circuit so as to control the aperture determining mechanism to be explained later. $CC_1$ is the control circuit presenting the control block of the magnet for actuating the camera, the multi-stabilized circuit block and the indication control block to which the illuminating diode $L_3$ is connected. The magnet $M_2$ is functionally engaged with the governer wheel in order to give the attraction member $m_1$ the mechanical delay characteristics in such a manner that after the elapse of a certain determined time after the excitation of the magnet $M_2$ by the circuit $m_2$, the switch $S_3$ is closed so as to release the holding of the release member of the switch $S_3$. $CC_2$ is the control circuit presenting the shutter control block and the shutter time automatic changing over block. $M_3$ is the magnet connected to the output of the shutter control circuit block so as to control the holding member of the rear shutter plane 113.

$S_1$ and $S_2$ are the switches provided so as to be functionally engaged with the shutter release button 7 in such a manner that the switch $S_1$ is closed when the button 7 is pushed down to the first step while $S_2$ is closed when the button 7 is pushed down to the second step. Both switches $S_1$ and $S_2$ are opened when the button 7 returns to the initial position. $S_3$ is the switch to be closed in functional engagement with the self timer set dial, 119 the front shutter plane and 120 the front shutter plane holding member for releasing the engagement with the front shutter plane 119 in functional engagement with the driving mechanism of the mirror 101 when the mirror has been raised.

121 is the exposure frame, 122 and 123 respectively the driving spring for the rear shutter plane and that for the front shutter plane, 124 the change over lever to be engaged with the cam part 119 of the front shutter plane 119 so as to be translated and 125 the change over lever to be engaged with the cam part 113A of the rear shutter plane 113 so as to be translated whereby, at the bent ends 124A and 125A of the lever 124 and 125, the switches $S_5$ and $S_9$ are provided. $S_5$ is the current economising switch which is opened when the front shutter plane is totally opened and closed when the film is wound up while $S_9$ is the synchronization switch. $S_6$ is the safety switch which is opened when the rear shutter plane starts to run and closed when the film is wound up. 126 is the change over lever being rotated by the end part 113B of the rear shutter plane 113 so as to change the switch $S_6$ from the switched off state to over to the switched on state. 127 is engaged with the cam 128 whose one end engages with the change over lever 126 and whose other end is functionally engaged with the charging cam so as to rotate by 180° each time. 129 is the aperture determining mechanism provided on the side face of the box of the mirror 101 of the camera body. 130 is the main driving sector gear being given the clockwise rotation power by the spring not shown in the drawing 130, whereby the end face is prevented from rotation by means of the holding lever 131. 132 is the slide member fixed on the sector gear, being composed so as to be in sliding contact with the resistance layer cemented on the insulation plate 133 in order to form the variable resistance $VR_5$ connected with the determining circuit $B_2$. 135 – 137 are the step up gear group composing the governer gear, whereby on the last governer 137 the holding lever 138 is provided, whose one end is attracted by the magnet $M_1$ and whose other end prevents the rotation of the escape wheel. In this manner the sector gear 130 drives the aperture present cam piece provided in the interchangeable lens 2 through the connecting mechanism not shown in the drawing, this system aspect has nothing to do directly with the present invention so that the detailed explanation will be omitted. $S_8$ is the switch which is closed in functional engagement with the button 8 for checking the current source voltage.

$VR_3$ is the resistance for the information input being in functional engagement with the signal member at the side of the lens in such a manner that the resistance value is automatically set to a value corresponding to the maximum aperture number F of the lens mounted. $C_1$ is the condenser for integrating the shutter time, $C_2$ the condenser for the self timer, $C_3$ the delay condenser for delaying the actuation of the camera during the light measurement, $C_4$ the memory condenser for storing the measured light information, $S_4$ the count switch functionally engaged with the start of the front shutter plane, $S_{11}$ the switch for B, $S_{12}$ the auto-manual change over switch and PW the current source.

FIG. 3 shows the wiring diagram among the integrated circuits (hereinafter called IC) and other elements, when the exposure control circuit is divided in the light measurement memory block IC PX-1, the information operation block IC PX-2 and the current supply control block IC PX-3.

Figure 2:
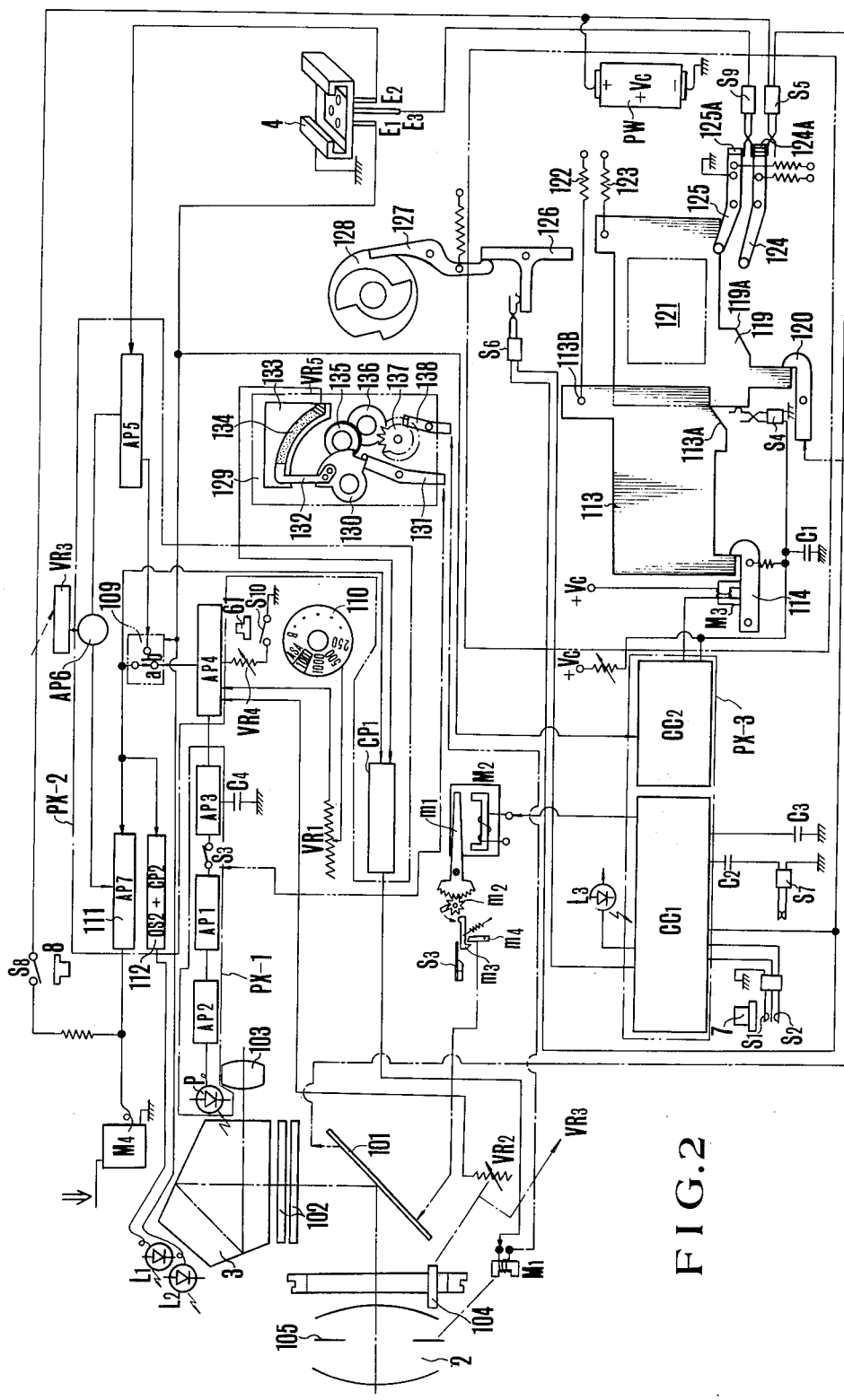
Figure 3:
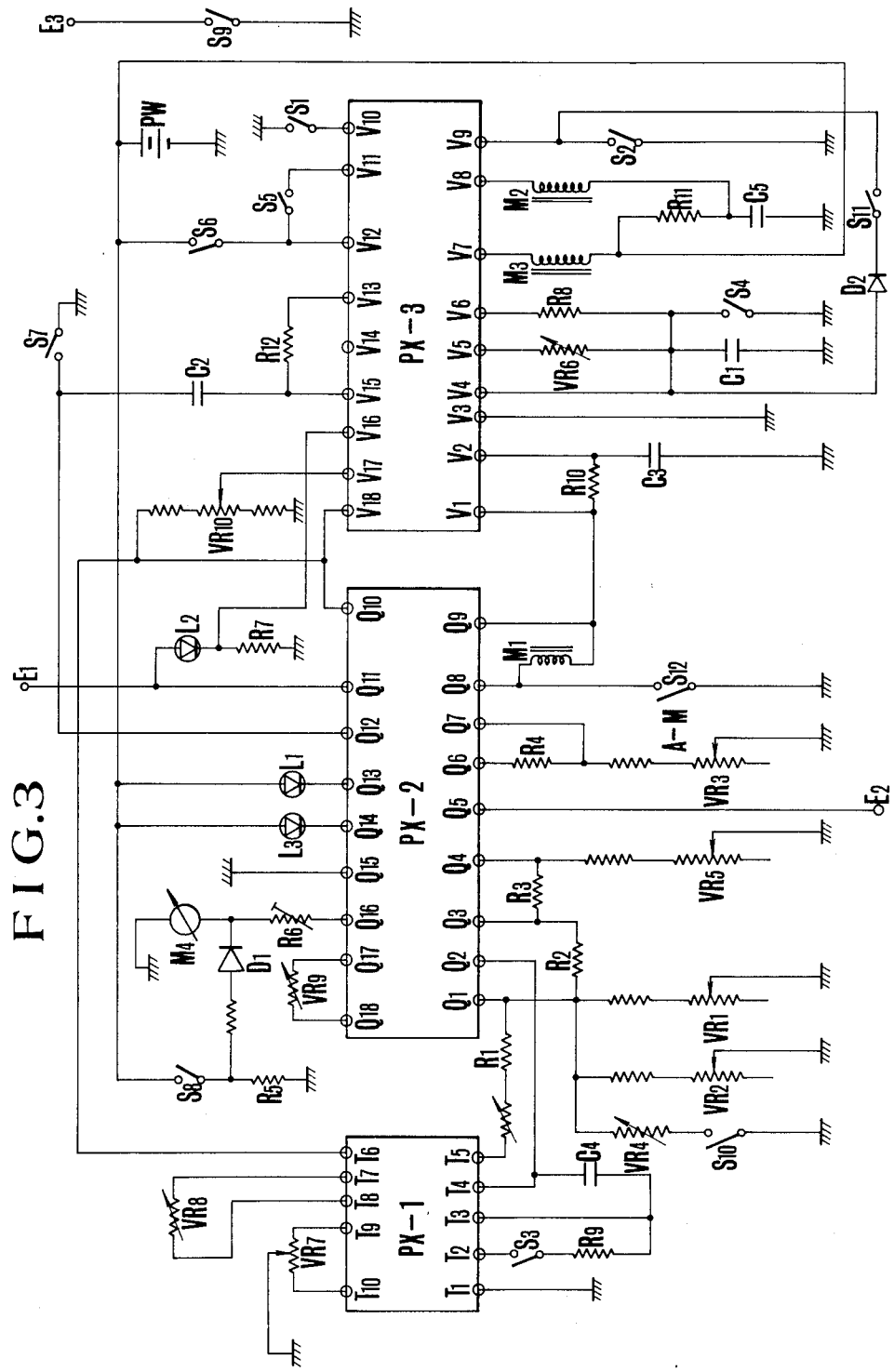
FIGS. 3 and 4 show the integrated circuit block diagram, dividing the above mentioned electrical circuits into the control block to be integrated and provided in the camera.

In the drawing, the same components as those in FIG. 2 have the same figure numbers. In FIG. 3, $VR_7$ is the resistance for adjusting the offset voltage in the light measurement circuit, $VR_8$ the resistance for adjusting the level in the light measurement circuit, $VR_9$ the resistance for adjusting the level in the information operation circuit and $VR_{10}$ the resistance for adjusting the level in the current supply circuit. $R_1 - R_4$ are the information operation resistances, $R_5$ the dummy resistance at the time of the battery checking, $R_6$ the resistance for adjusting the meter, $R_7$ the resistance for giving PX-3 IC the signal for changing over the photographic mode by means of the charge completion signal of the flash light device at the time of taking a photograph under flash light, $R_8$ the resistance for giving the shutter time proper for the flash light photography, $R_9$ the resistance for preventing the flickering, $R_{10}$ the resistance for delaying the actuation of the camera during the light measurement, $R_{11}$ the resistance for limiting the integrating time for $C_5$, $R_{12}$ the resistance for the self timer, $D_1$ and $D_2$ the diodes for separation and $C_5$ the charging condenser for driving the magnet $M_2$ for actuating the camera.

Figure 4:
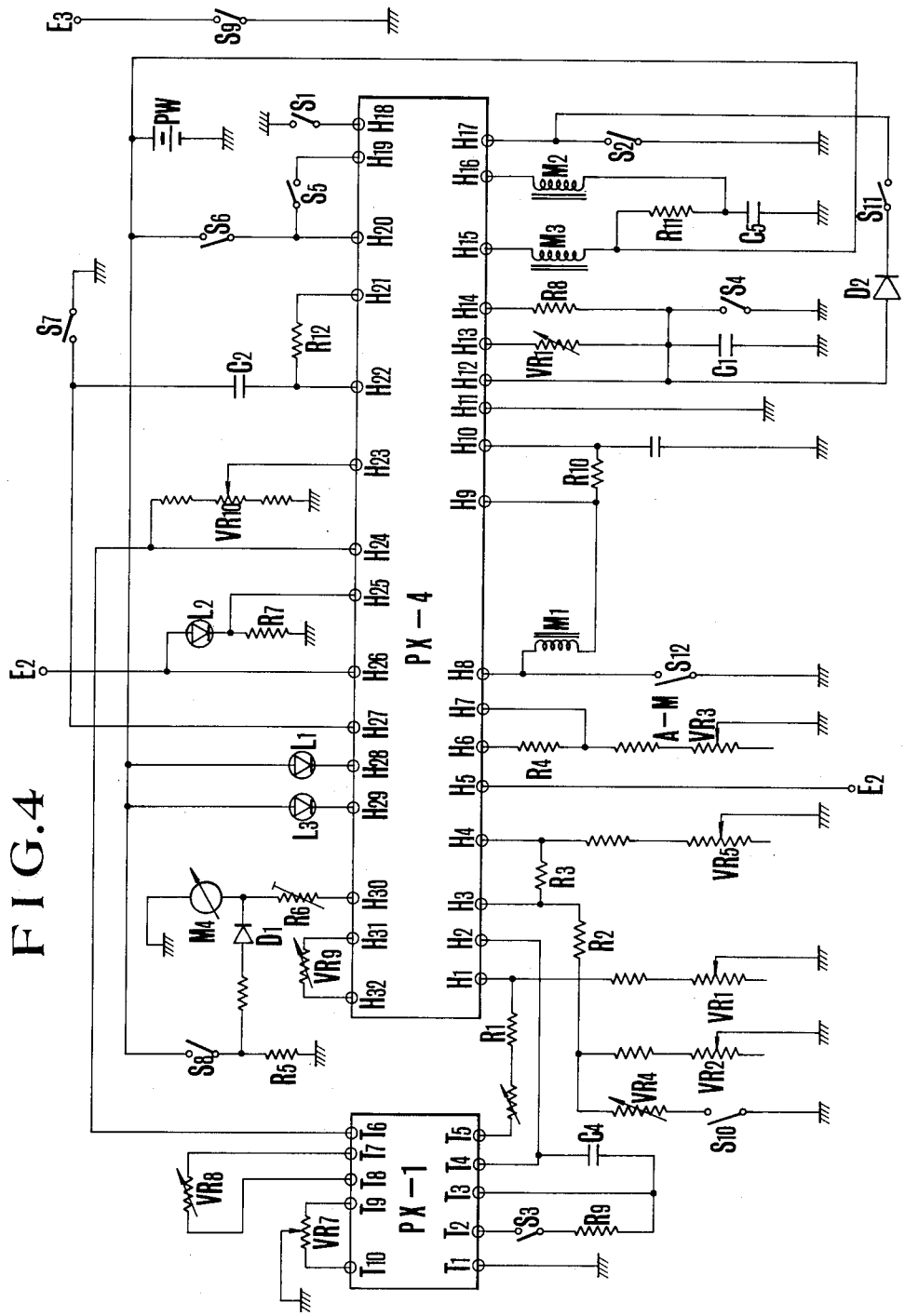
Figure 5:
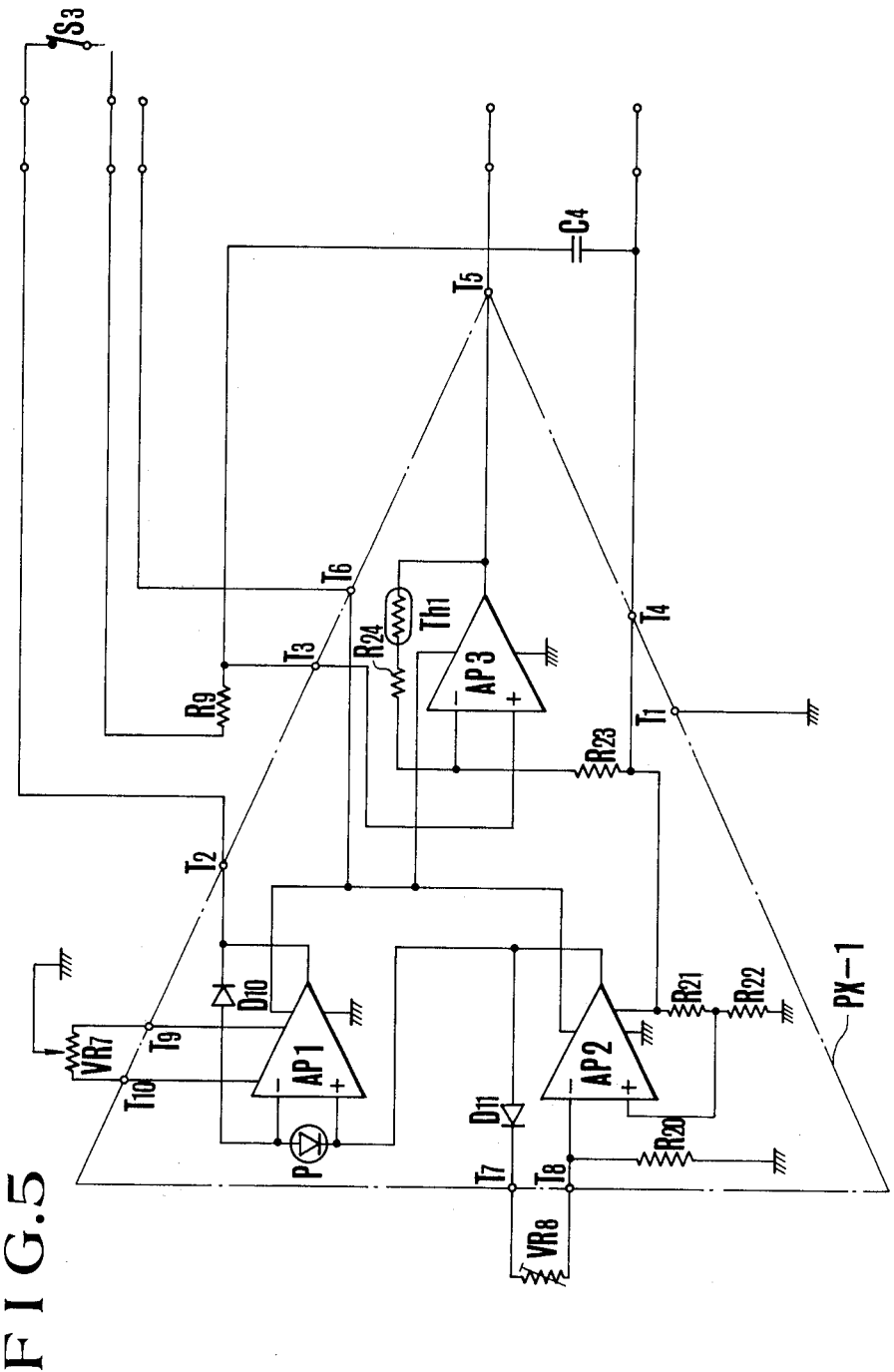
FIGS. 5 – 7 show the detailed diagram of this integrated circuit.
Figure 6:
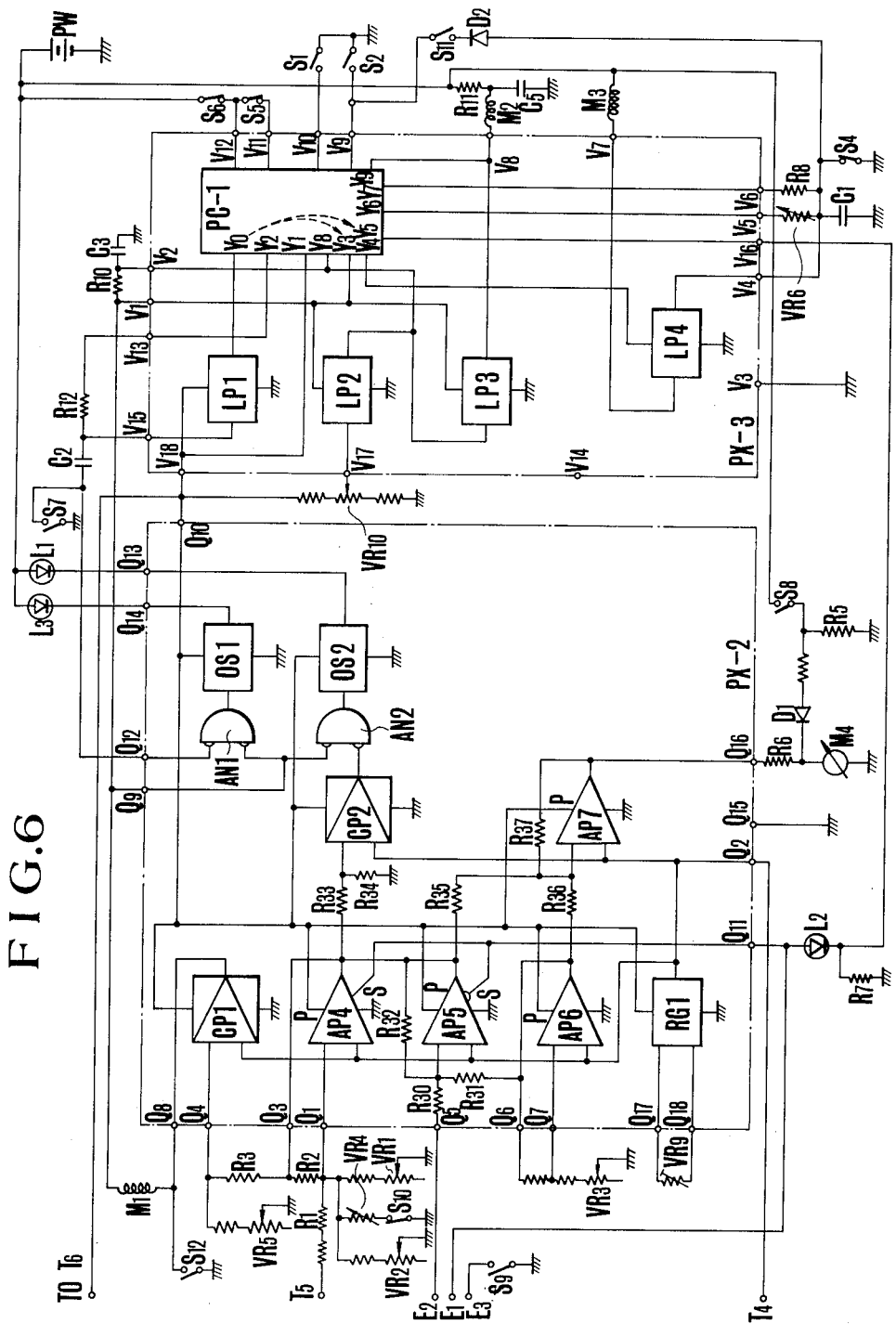

FIG. 4 shows the wiring diagram among the IC's and other members when the exposure control circuit is divided in the light measurement memory IC and the information operation control IC. The same other members than IC as those in FIG. 3 present the same figures. FIGS. 5 and 6 are the detailed diagram of the IC block diagram in FIG. 3. Below, the operation of this circuit will be explained in accordance with this drawing.

The character of the IC-circuit shown in FIGS. 3 and 4 is that the light measurement memory block IC for measuring the brightness of the object to be photographed by means of the photodiode and letting the memory condenser $C_4$ store the measurement signal and the actuating block IC for operation and actuating the camera are separated from each other. This means that the blocks treating the signal with different level orders are separated from each other so that it is possible to prevent the mixture of the signal component from the other block into the light measurement block with comparatively low level of signal.

FIG. 5 shows the concrete light measurement memory electrical circuit of the IC PX-1 shown in FIGS. 3 and 4. In the drawing, $AP_1$, $AP_2$ and $AP_3$ are the operation amplifiers. A constant voltage is supplied to the terminal $T_4$ from the terminal $Q_2$ of the IC PX-2, so as to set the bias level of $AP_2$. The photoelectric current of the photovoltaic element P is logarithmically compressed by the logarithmic transducing element $D_{10}$ in such a manner that the output voltage in form of arithmetic progression toward the logarithmic value (Bv value) of the brightness of the object to be photographed is stored in the memory condenser $C_4$ through the terminal $T_3$. The temperature fluctuation of the logarithmic transducing element $D_{10}$ is compensated by means of the diode $D_{11}$ and the thermister $Th_1$. $R_{20} - R_{24}$ are the auxiliary resistances for operating the light measurement memory circuit in normal condition and carrying out a proper temperature compensation, whereby the detailed explanation will be omitted. At the output terminal $T_5$ of this light measurement memory circuit, an output (Bv - Avo - Avc) constant toward the temperature fluctuation is produced by means of the effect of the above mentioned temperature compensating circuit. Bv is the information of the brightness of the object to be photographed and Avo and Avc the information of the vignetting taking place near the maximum aperture number F of the mounted lens 2 for measuring the totally opened light measurement through the lens. In FIG. 6, this camera is of automatic exposure control system with priority on shutter speed, so that when the shutter time (Tv) and the film sensitibity (Sv) are set, the shutter time set resistance $VR_6$ and the resistance $VR_1$ for setting (Sv - Tv) in functional engagement of the above are also set.

FIG. 6 shows the concrete electrical circuits of the IC PX-2 and IC PX-3 shown in FIG. 3. In the drawing, PX-2 and PX-3 are respectively in the dotted lines. The output terminal $T_5$ of the IC PX-1 shown in FIG. 5 is connected to the terminal $Q_1$ in functional engagement with the signal member 104 through the information setting circuit net connected in parallel with the vignetting compensation resistance $VR_2$, the exposure value compensation resistance $VR_4$ and the shutter time ASA sensitivity setting (Sv - Tv) resistance $VR_1$, so as to be connected to the input of the operation amplifier $AP_4$. The amplifier $AP_4$ is the operation amplifier presenting a change over function, whereby the amplifier $AP_4$ presents the current supply input P and the change over signal input S and when the change over signal is applied to the input S the output is interrupted. $E_1$ and $E_2$ connected to the terminal $Q_2$ and $Q_5$ are the signals from the flash light device whereby $E_1$ is the charge completion signal sent from the speed light device when the main condenser of the speed light device is sufficiently charged. It is sufficient to make use of the discharge current of the neon tube used until now for showing the charge completion of the main condenser in order to form the $E_1$ signal. On the other hand, $E_2$ is the appointed aperture signal sent from the speed light device, for setting the diaphragm at a certain determined aperture value. It is sufficient to form the signal $E_2$, for example, in such a manner that a constant voltage is applied to the resistance corresponding to the light quantity of the speed light device so as to supply the then voltage drop to the camera side, whereby the signal $E_2$ automatically sets the aperture at the camera body from the speed light device. $AP_5$ is the operation amplifier whose input is connected to the terminal $A_5$ through the resistance $R_{30}$ whereby the amplifier $AP_5$ is put in operation by means of the change over signal input to the terminal S. $AP_6$ is the operation amplifier whose input is connected to the variable resistance $VR_3$, so as to indicate by means of the meter the aperture value set in advance in cooperation with the operation amplifier $AP_7$. $CP_1$ is the comparison amplifier circuit whose one input terminal is connected to the variable resistance $VR_5$ through the terminal $Q_4$ and whose other input terminal is connected to the operation amplifiers $AP_4$, $AP_5$ and $AP_6$, whereby the output terminal of the amplifying circuit is connected to the magnet $M_1$. $CP_2$ is the comparison amplifying circuit, $AN_1$ and $AN_2$ the NAND gates, $OS_1$ and $OS_2$ respectively the mono stabilizer and the multi stabilizer. In the case of the day-light photography with the speed light device, the signals $E_1$ and $E_2$ are not applied so that the operation amplifier $AP_5$ is out of operation while $AP_4$ is in the state of operation. The operation voltage is produced at the terminal $Q_{10}$ by means of the output from the terminal $Y_1$ of the PC-1 circuit when the release member is pushed down to the first step so as to allow the current to start to run, whereby the comparison amplifying circuit $CP_1$, the operation amplifier $AP_4$ and $AP_6$ and the voltage regulating circuit $RG_1$ are brought in the operation state in such a manner that the constant voltage bias from the output terminal of the $RG_1$ circuit is applied to the amplifiers $AP_4 - AP_7$ and the comparison amplifying circuit $CP_1$ and $CP_2$. As explained above the value (Bv - Avo - Avc) is stored in the memory condenser $C_4$ so that the output APX of the $AP_4$ is the difference between Av and Avo (APX = Av - Avo = $\Delta$Av) by means of the set information circuit net and the operation amplifier $AP_4$ through the terminal $T_5$. The reason is that the difference between the film sensitivity and the shutter time (Sv - Tv) is put in through the resistance as information and in functional engagement of the totally open signal pin 104 of the mounted lens 2 the information (Avo) of the maximum aperture number F and the information (Avc) of the vignetting compensation is put in as information through the resistance $VR_5$ and $VR_2$. The information of the brightness (Bv - Avo - Avc), the difference between the film sensitivity and the shutter time (Sv - Tv) and the vignetting compensation information (Avc) are put in the operation amplifier $AP_4$ so as to produce the output APX as follows.

$$APX = (Bv - Avo - Avc) + (Sv - Tv) + (Avc) \quad (1)$$

the condition of the proper exposure is as follows;

$$Bv + Sv = Av + Tv \quad (2)$$

when (2) is put in (1)

$$APX = Av - Avo = \Delta Av \quad (3)$$

On the other hand, the operation amplifier $AP_7$ applies the information Avo from the resistance $VR_3$ to the resistance $R_{35}$ through the amplifier $AP_6$, carrying out an addition of (Av - Avo) + Avo together with the resistance $R_{35}$ in such a manner that the $AP_7$ produces Av, namely the aperture absolute value for obtaining the proper exposure which is indicated by the meter $M_4$. When the comparison amplifying circuit $CP_2$ produces the output, the $OS_2$ circuit operates and the illuminating diode lights up. The detailed explanation, however, will be omitted. When the release member is pushed down to the second step so that the current starts to be supplied from the terminals $Y_3$ and $Y_4$ of the PC-1 circuit, the AND gate $AN_2$ does not operates, the oscillator $OS_2$ does not operate any more and the illuminating diode $L_1$ is put out so that the electric power consumption decreases. At the same time, after the elapse of a certain determined time (about 10 m.sec. in this circuit) determined by the resistance $R_{10}$ and condenser $C_3$ the level detector $LP_3$ is inversed and the first holding magnet $M_2$ for actuating the camera is driven so that the mirror quick return mechanism is released, whereby the holding lever 131 releases the sector gear 130 so as to rotate the slide member 132 anticlockwise. When the sector gear rotates into the position corresponding to the aperture value for giving a certain determined proper exposure basing upon the input of the variable resistance $VR_5$ consisting of the slide member 132 and the resistance 134, the object brightness information in the memory condenser, the set shutter time information and the film sensitivity information, the comparator $CP_1$ is inversed so as to excite the magnet $M_1$ whereby the escape wheel is held by the holding lever 138 so that the diaphragm preset mechanism at the side of the interchangeable lens in functional engagement with the sector gear 130 is set at the position for setting the determined aperture.

FIG. 8 shows the PC-1 circuit diagram for forming the above mentioned signals $Y_0$, $Y_1$, $Y_2$, $Y_3$, $Y_4$ – $Y_9$. Below the PC-1 circuit will be explained together with the PX-3 circuit shown in FIG. 6. In the drawing, PW is the current source, $Y_0$ – $Y_9$ the output terminals, $V_5$, $V_6$, $V_{16}$, $V_{11}$, $V_{12}$ the input terminals for the integrated circuit PX-3, $Tr_1$ – $Tr_{11}$ the transistors, $D_{11}$ – $D_{14}$ the diodes and $R_{101}$ – $R_{114}$ the fixed resistances. When the shutter is wound up, $S_5$ and $S_6$ are brought in the switched on state so that when the release member is pushed down to the first step and the switch $S_1$ is closed, the base current flows through the transistor $Tr_1$ which is brought in the conductive state. In consequence, the current starts to run from the terminal $Y_1$. (Output wave form at the terminal $Y_1$ in FIG. 9). When the release member is pushed down to the second step and the switch $S_2$ is closed, the transistors $Tr_1$ and $Tr_2$ becomes conductive, holding each other in the conductive state. In consequence even if the $S_2$ is opened, the transistors $Tr_1$ – $Tr_3$ remain in the conductive state. When the transistor $Tr_2$ becomes conductive, the outputs are produced at the terminal $Y_2$ and $Y_3$, whereby in case the self timer is set the switch $S_7$ (FIG. 6) is in the switched on state so that after the elapse of the time determined by the condenser $C_2$ and the resistance $R_{12}$ the level detecter circuit $LP_1$ produces the output and then the current starts to be supplied from the terminal $V_{18}$ of the PX-3 integrated circuit. On the other hand in case the switch $S_7$ is opened, the outputs are produced at the terminals $Y_2$ and $Y_3$ at the same time with the switching on of the switch $S_2$ so that the level detecter circuit $LP_1$ becomes also ready to supply the current at the same time with the switching on of the switch $S_2$. Hereby a constant voltage signal is supplied to the level detector circuit $LP_1$ from the voltage regulator circuit $RG_1$ of the integrated circuit PX-2 in such a manner that the level of the input signal is detected by the detector circuit so as to produce the actuating signal at the terminal $Y_0$ in case the level is larger than a certain determined level. The condenser $C_B$ is the discharging condenser F of the condenser $C_3$ shown in FIG. 6. By means of the output produced at the terminal $Y_3$ the time constant circuit consisting of $R_{10}$ and $C_3$ starts to be charged, the magnet $M_1$ starts to be supplied with the current and the NAND gates operates in an input prohibiting way. The time constant of the time constant circuit $R_{10}$ and $C_3$ is set in advance at the time necessary for the brightness measurement of the object to be photographed and the memory operation so that when the charge level of the condenser $C_3$ reaches a certain determined level by the output at the terminal $Y_3$ after the elapse of a certain determined time the level detector circuit $LP_3$ produces the output, the magnet $M_2$ is excited by the charge in the condenser $C_5$ and the memory switch $S_3$ is opened after the mechanical delay time by the governer $m_2$ (FIG. 2), so as to release the mirror. In case at this time the voltage of the current source PW is too low for the normal operation, the condenser $C_3$ can not be charged any more by the level detector circuit $LP_2$ so that the magnet $M_2$ is never excited. The output of the $LP_3$ circuit is applied to the base of the transistor $Tr_7$ in the PC-1 circuit through the terminal $Y_9$, so that the transistor $Tr_7$ becomes conductive so as to produce the current supply output at the terminal $Y_4$ (FIG. 9). By means of the output at the terminal $Y_4$ the level detector circuit $LP_4$ starts to be supplied with current and the starting switch $S_4$ is opened in functional engagement with the running of the front shutter plane whereby the condenser $C_1$ starts to be charged.

The signal $E_1$ is applied to the terminal $Y_5$ of the PC-1 circuit (the terminal $V_{16}$ of the integrated circuit PX-3) through the illuminating diode (FIG. 6) so that when the signal $E_1$ is supplied from the speed light device the transistors $Tr_8$ and $Tr_9$ becomes conductive whereby the resistance $R_8$ is selected through the terminal $Y_7$ and the time constant circuit consisting of the resistance $R_8$ and the condenser $C_1$ starts to be supplied with the current at the same time with the switching off of the switch $S_4$.

Normally the shutter time setting resistance $VR_6$ is selected when the transistor $Tr_{11}$ is switched on. When the condenser $C_3$ has been charged, the transistor $Tr_6$ connected to the terminal $Y_8$ becomes conductive so that the condenser $C_3$ is discharged. When the release is operated in the above mentioned composition the current supply signals as shown in FIG. 9 are formed at the terminals $Y_1$ to $Y_4$ one after another.

Below the operation is explained.

I. In the case of the ordinary photography.

When the release member of the camera is pushed down to the first step, the switch $S_1$ is closed so that the output is produced at the terminal $Y_1$, so as to start to supply the current to the circuits $OS_1$, $OS_2$, $CP_1$, $AP_1$, $AP_2$, $A_3$, $AP_4$, $AP_5$, $AP_6$ and $RG_1$. At this time, the memory switch $S_3$ remains closed, the signal corresponding to the signal (Bv - Avo - Avc) is stored in the memory condenser $C_4$, whereby the output signal corresponding to the information (Av - Avo) is applied to the input of the comparison circuit $CP_1$ by the operation amplifier $AP_4$ as explained above. This is the information corresponding to the step number of the diaphragm to be closed down from the maximum aperture value. When the release member is pushed down further, the switch $S_2$ is closed and the current supply outputs are formed at the terminals $Y_2$ and $Y_3$, whereby the magnet $M_1$ is ready to be supplied with current. When the charge in the condenser $C_5$ excites the magnet $M_2$ by means of the output of the $LP_3$ circuit (output at $Y_4$) after the elapse of the time determined by the time constant circuit $R_{10}$, $C_3$, the mirror is released after the mechanical governer time whereby at the same time the switch $S_3$ is opened. In consequence, the mirror is raised while the variable resistance $VR_5$ is set at the value corresponding to the diaphragm step number by means of the $CP_1$ circuit, whereby the magnet $M_1$ is excited so as to preset the aperture. At this time, the terminal $Y_6$ is ready to supply the current so that the front shutter plane 113 is released after the mirror is raised, whereby when the starting switch $S_4$ is opened the magnet $M_3$ is excited after the elapse of the time determined by the resistance $VR_6$ and the condenser $C_1$ so as to close the shutter. When hereby the current source PW is exhausted the LP circuit can not operate the magnet $M_2$ so that the camera can not be actuated. $S_8$ is the button for checking the voltage of the current source PW whereby it is possible to read the voltage of the current source PW from the scale angle of the meter $M_4$.

II. In the case of the flash light photography.

When the speed light device is mounted and the main condenser in the speed light device has been charged, the illuminating diode $L_2$ lights up by the output $E_1$. At the same time by means of the signal $E_1$, the amplifier $AP_4$ is brought in the non operation state while the amplifier $AP_5$ is brought in the operation state. $E_2$ is the signal corresponding to the appointed aperture value so that when the maximum aperture value of the mounted lens is set in the resistance $VR_3$, the $AP_5$ produces the information of the step number of the diaphragm to be closed from the maximum aperture value.

The output of the amplifier $AP_5$ is connected to the input of the comparison circuit $CP_1$, so that the presetting of the aperture and the automatic setting of the aperture can be carried out in the same way as mentioned above.

When the flash light device is mounted on the accessary shoe 4, the charge completion signal from the flash light device is given to the camera through the terminal $E_1$ so as to light up the illumination diode $L_2$ for indicating the charge completion whereby the photographic mode is automatically changed from the day-light photographic mode over to the flash light photographic mode. Namely, by means of the signal from the terminal $Q_{11}$, the operation amplifier $AP_4$ is interrupted and $AP_5$ starts to operate while the shutter time is automatically set by means of the signal from the terminal $V_{16}$ at the time proper for the flash light photography, determined by the resistance $R_8$ and the condenser $C_1$. When the absolute value information (Av) from the flash light device is put in the camera through the terminal $E_2$, this aperture information Av and the information Avo of the maximum aperture number F through the resistance $VR_3$ are put in the operation amplifier $AP_5$. The output APZ of $AP_5$ is as follows.

$$APZ = Av - Avo = \Delta Av \qquad (4)$$

Namely, the output corresponds to the step number of the diaphragm to be closed down from the maximum aperture. The output of the $AP_5$ and the information (Avo) of the maximum aperture number F of the lens are put in the operation amplifier $AP_7$ through $AP_6$ so as to produce the output APY as follows.

$$APY = (Av - Avo) + Avo = Av \qquad (4)$$

The aperture signal from the flash light device is then indicated in the view finder of the camera. These are the outputs equivalent to the day-light photographic mode, whereby by means of the aperture signal from the flash light device the diaphragm at the side of the camera is automatically set through the comparator $CP_1$.

Through the terminal $E_3$, the synchronization between the flash light device and the camera is carried out. Further this circuit presents a safety device which is designed in such a manner that in case the voltage of the current source PW goes down the level detector $LP_2$ is no more inversed and the potential at the terminal $V_2$ of the time constant circuit $R_{11}$, $C_3$ for delaying the actuation of the camera does not go up for ever and therefore the level detecter $LP_3$ is not inversed so as to stop the operation of the camera.

Further, by the start of the front shutter plane, the count switch $S_4$ is opened so as to start charging the condenser $C_1$ through the resistance $VR_6$. When the front shutter plane is totally opened the synchronization switch $S_9$ is closed and the current economization switch $S_5$ is opened so that the current supply circuit interrupts the current supply to $Y_1$, so as to decrease the power consumption. When the magnet $M_3$ is no more excited after the elapse of a certain determined time the rear shutter plane 113 is released so as to close the shutter, whereby the switch $S_6$ is opened by the rear shutter plane running to the totally closed position so that the current supply to all the control circuit is interrupted.

In consequence, minimum electric power is supplied to all the control circuits only during the necessary time.

It is also possible to carry out the necessary exposure compensation if the exposure compensation switch $S_{10}$ is opened while the resistance $VR_4$ is properly selected. When the self timer is used the switch $S_7$ is closed, so that the level detecter $LP_1$ is inversed after the elapse of the time determined by the time constant circuit consisting of the resistance $R_{13}$ and the condenser 2 after the switch $S_2$ is closed by the second stroke of the shutter button so as to start the current supply to $Y_3$ and $Y_4$ and actuate the camera. The operation after the actuation is same as before. During the operation of the self timer the AND gate $AN_1$ drops and the the oscillator $OS_1$ operates whereby the illuminating diode $L_3$ for indicating the operation of the self timer twinkles. When at the time of using the "B" shutter the shutter dial 110 is set at the position "B" the "B" switch $S_{11}$ is closed, whereby when the shutter button 7 is pushed down the shutter remains opened. When the pushed shutter button 7 is released, the switch $S_2$ is opened so that the condenser $C_1$ starts to be charged through the resistance $VR_6$ and after the elapse of a certain determined time the magnet $M_3$ is excited in such a manner that the rear shutter plane 113 starts to run so as to close the shutter, which means that the "B" photography is carried out.

Figure 1A:
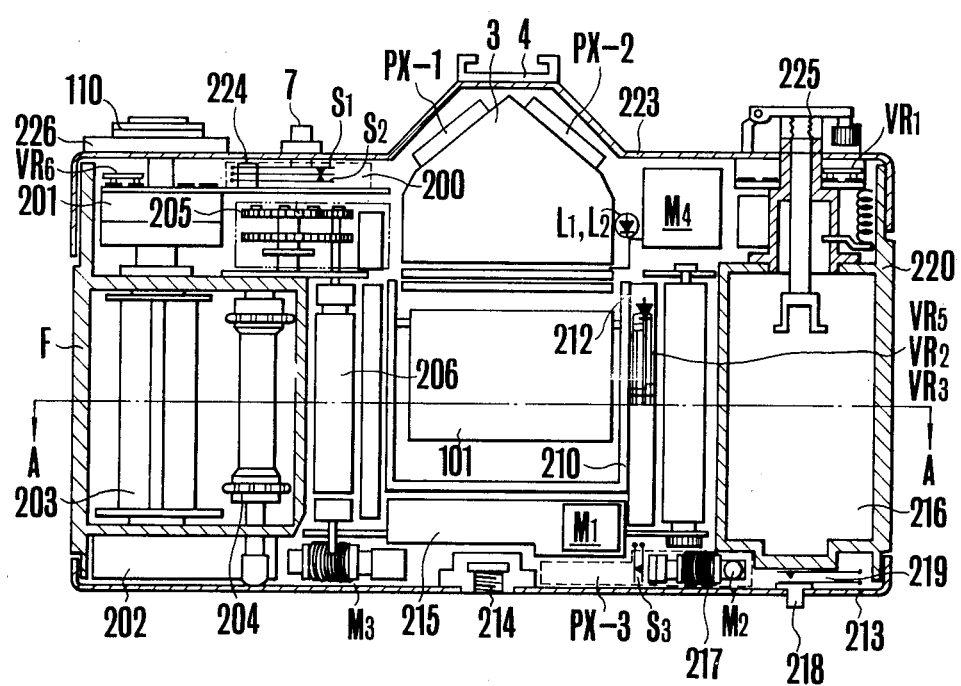
Figure 1B:
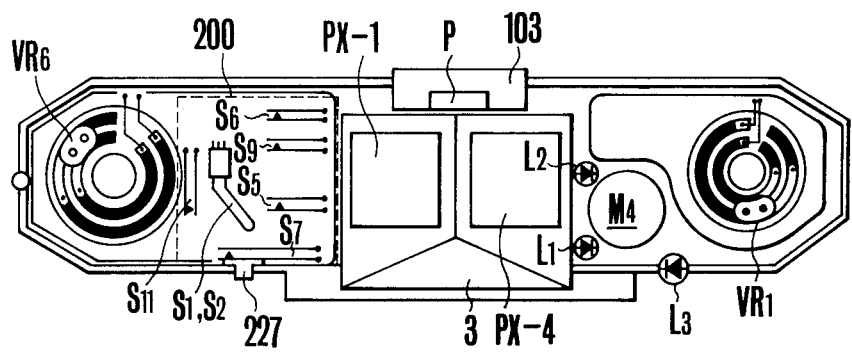
Figure 1C:
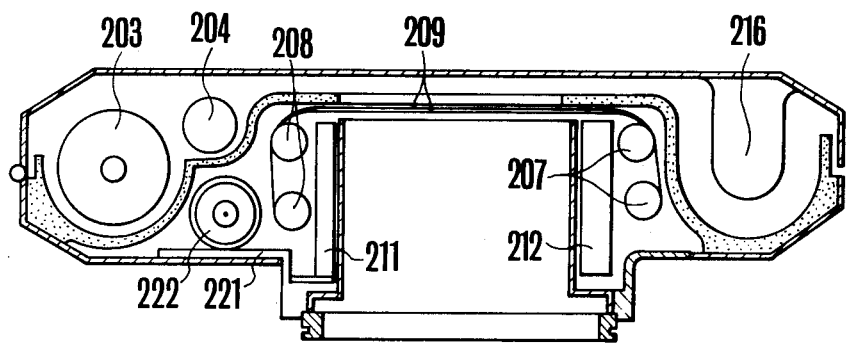
Figure 7:
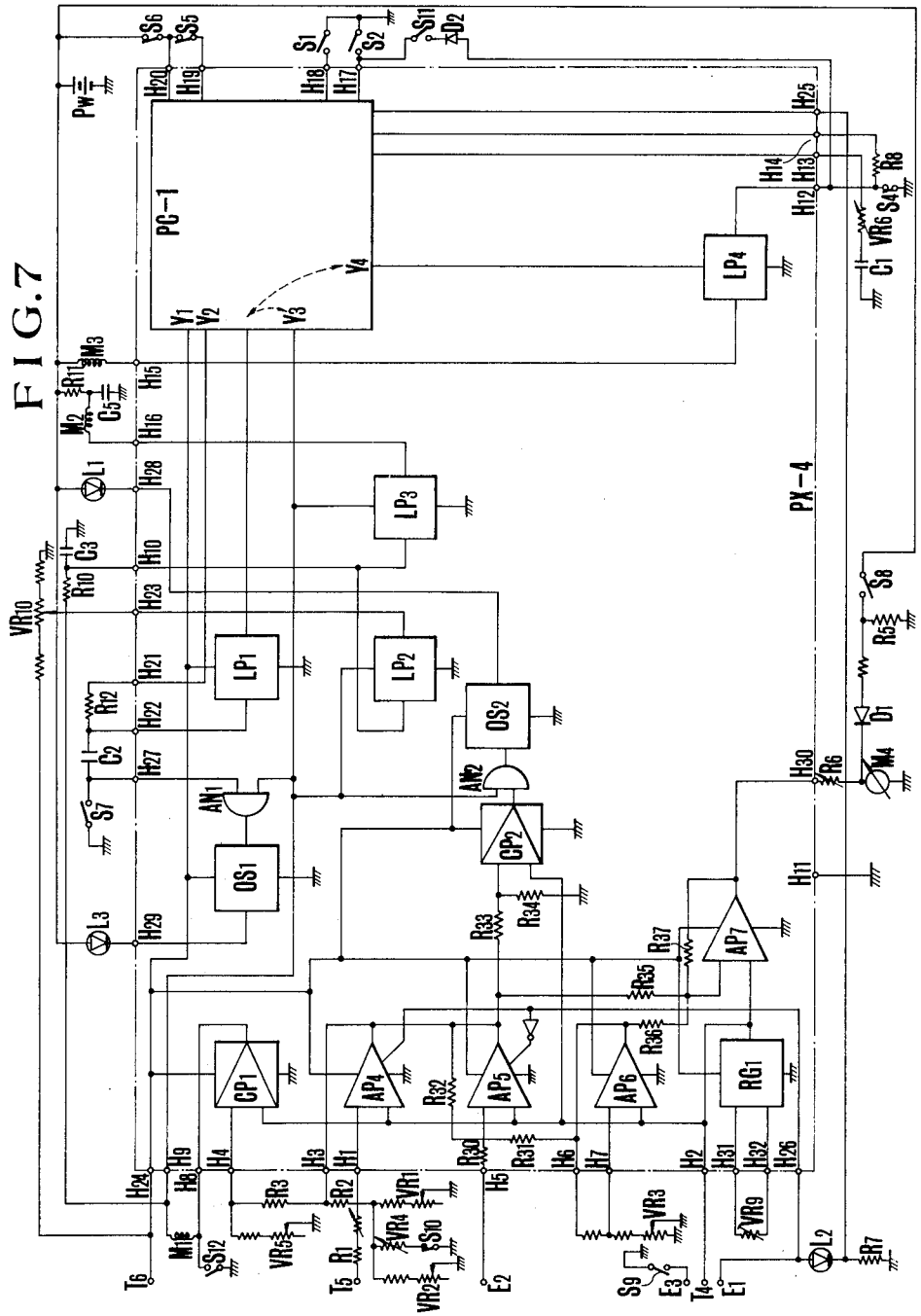

FIGS. 5 and 7 show the detailed diagrams of the IC block diagram shown in FIG. 4, whereby the operation of the circuit is same as those shown in FIGS. 5 and 6. FIGS. 3 and 4 respectively show the IC-block divided in 3 ICs and that divided in 2 ICs. In case the block is divided in 3 ICs as is shown in FIG. 3, it is possible to control the influence of the noise on the photovoltaic element or the current supply to the members outside of the block by means of the current supply IC in the camera so that it is most rational to provide the light measurement memory IC PX-1 and the information operation IC PX-2 in the pentagonal roof as is shown in FIG. 1-a and the current supply IC PX-3 at the bottom of the camera. In case the block is divided in 2 ICs as is shown in FIG. 4 it is most convenient for the sake of the good appearance of the camera to provide the light measurement memory IC PX-1 and the current supply control PX-4 in the pentagonal roof as is shown in FIG. 1-b. When it is possible to compose the control condenser, the resistances and so on in the hybrid I C or at the same time in I C the number of the pins of I C can be reduced, which is very convenient for the assembling and the wiring in the camera. Further it is possible that the idle terminals takes place in connection with the standardization of the I C package, whereby it is possible to make use of these idle terminals so as to realize a new system or to make use of the integrated circuits in the standardized integrated circuit member linkage system so as to realize the integrated circuit system applicable for various kinds of systems in common.

As explained above, in accordance with the present invention, it is possible to provide the integrated circuit blocks with comparatively low signal level such as for light measurement memory separated from the circuit blocks for producing the actuation signal, the driving signal and so on, so that the fear of the signal mixture between the integrated circuit blocks can be eliminated while, only after the integrated circuit block with low signal level has been operated, the current supply to the integrated circuit block is started. Accordingly the fear of the mixture of the noise from the latter integrated circuit into the former is extremely eliminated.

What is claimed is:

1. A camera with electronic control function comprising:
   A. a camera body;
   B. photographic lenses, said lenses being interchangeably mounted on the camera body and presenting certain determined maximum aperture values;
   C. an exposure adjusting device, said device being built in the camera body and including:
      a. a light sensing means, said means being provided at the position at which the light beam coming through the photographic lenses is received so as to produce an electrical signal,
      b. an exposure value setting means, said means setting other set exposure informations than the exposure informations to be adjusted so as to produce an electrical signal,
      c. an exposure measuring circuit, said circuit including an input to be connected to the light sensing means, an output and a first current supply input and being composed as a first integrated circuit,
      d. an exposure operation circuit, said circuit including an input to be connected to the exposure value setting means and an input to be connected to the exposure measuring circuit and a second current supply input for said circuit to operate effectively,
      e. an exposure control circuit, said circuit including an input to be connected to the output of the exposure operation circuit, an output for giving an output signal corresponding to the exposure information value to be adjusted and a third current supply input for said circuit to operate effectively,
      f. an exposure determining means, said means being functionally engaged with the photographic lenses so as to restrict the light beam passing through the lenses further said means including an electromagnetic means functionally engaged with the exposure control circuit; and
   D. a current supply control circuit, said circuit being built in the camera body and including a current supply output for supplying the current to the first, the second and the third current supply input in functional engagement with the actuation of the camera body and further including a signal producing circuit for supply current to the third current supply input later than the first and the second current supply input.

2. A camera with electronic control function according to claim 1, wherein the camera body includes a second integrated circuit and a third integrated circuit, the exposure operation circuit being composed in the second circuit and the exposure measurement circuit being composed in the third integrated circuit.

3. A camera with electronic control function according to claim 1, where the camera body includes a second integrated circuit and where at least the control circuit and the current supply circuit are composed in the second integrated circuit.

4. A camera with electronic control function according to claim 2, wherein the third integrated circuit is provided in the lower part of the camera body while the first and the third integrated circuit are provided separated from each other in the upper part of the camera body.

5. A camera with electronic control function according to claim 1, wherein the camera body includes a second integrated circuit, the exposure control circuit is composed in the second integrated circuit, and the second integrated circuit is arranged spaced apart from the first integrated circuit.

6. A camera with electronic control function comprising:
   A. a camera body;
   B. Photographic lenses, said lenses being interchangeably mounted on the camera body;
   C. exposure adjusting device, said device being built in the camera body and including:
      a. a light sensing means, said means being provided at the position at which the light beam coming through the photographic lenses is received so as to produce an electrical signal;
      b. An exposure value setting means, said means setting other set exposure informations than the exposure informations to be adjusted so as to produce an electrical signal,
      c. an exposure measuring circuit, said circuit including an input to be connected to the light sensing means, and output and a first current supply input and being composed as a first integrated circuit,
      d. an exposure operation circuit, said circuit including an input to be connected to the exposure value setting means and an input to be connected to the exposure measuring circuit and a second current supply input for said circuit to operate effectively,
      e. an exposure control circuit, said circuit including an input to be connected to the output of the exposure operation circuit, an output for giving an output signal corresponding to the exposure information value to be adjusted and a third current supply input for said circuit to operate effectively,
      f. an exposure determining device, said device being built in the camera body, and being controlled in its operation by the output signal of the exposure control circuit, and D. a current supply control circuit, said circuit being built in the camera body and including a current supply output for supplying the current to the first, the second and the third current supply input in functional engagement with the actuation of the camera body and further including a signal producing circuit for supply current to the third current supply input later than the first and the second current supply input.

7. A camera with electronic control function according to claim 6, wherein the camera body includes a second integrated circuit and the current supply control circuit are composed in the second integrated circuit.

8. A camera with electronic control function according to claim 6, wherein the camera body includes a second integrated circuit and a third integrated circuit, the exposure operation circuit is composed in the second integrated circuit, while the exposure control circuit and the current supply control circuit are composed in the third integrated circuit.

9. A camera with electronic control function according to claim 6, wherein the exposure operation circuit further includes an electrical memory circuit at its output, said memory circuit is connected to the input of the exposure control circuit.

10. A camera with electronic control function according to claim 6, wherein the camera body further includes an electronic changing over means for changing over the photographic mode and the input for receiving an external signa., said external signal being supplied to the operation circuit by means of said changing over means.

11. A camera with electronic control function according to claim 6, wherein the current supply control circuit includes a timer circuit, said timer circuit being set at least at the time necessary for the exposure measuring circuit to measure the light and connected to a signal producing circuit.

12. A camera with electronic control function according to claim 6, wherein the current supply control circuit includes a timer circuit, said timer circuit being set at the time necessary for the self timer to carry out a self timer photography and connected to a signal producing circuit.

* * * * *